United States Patent Office 3,414,757
Patented Dec. 3, 1968

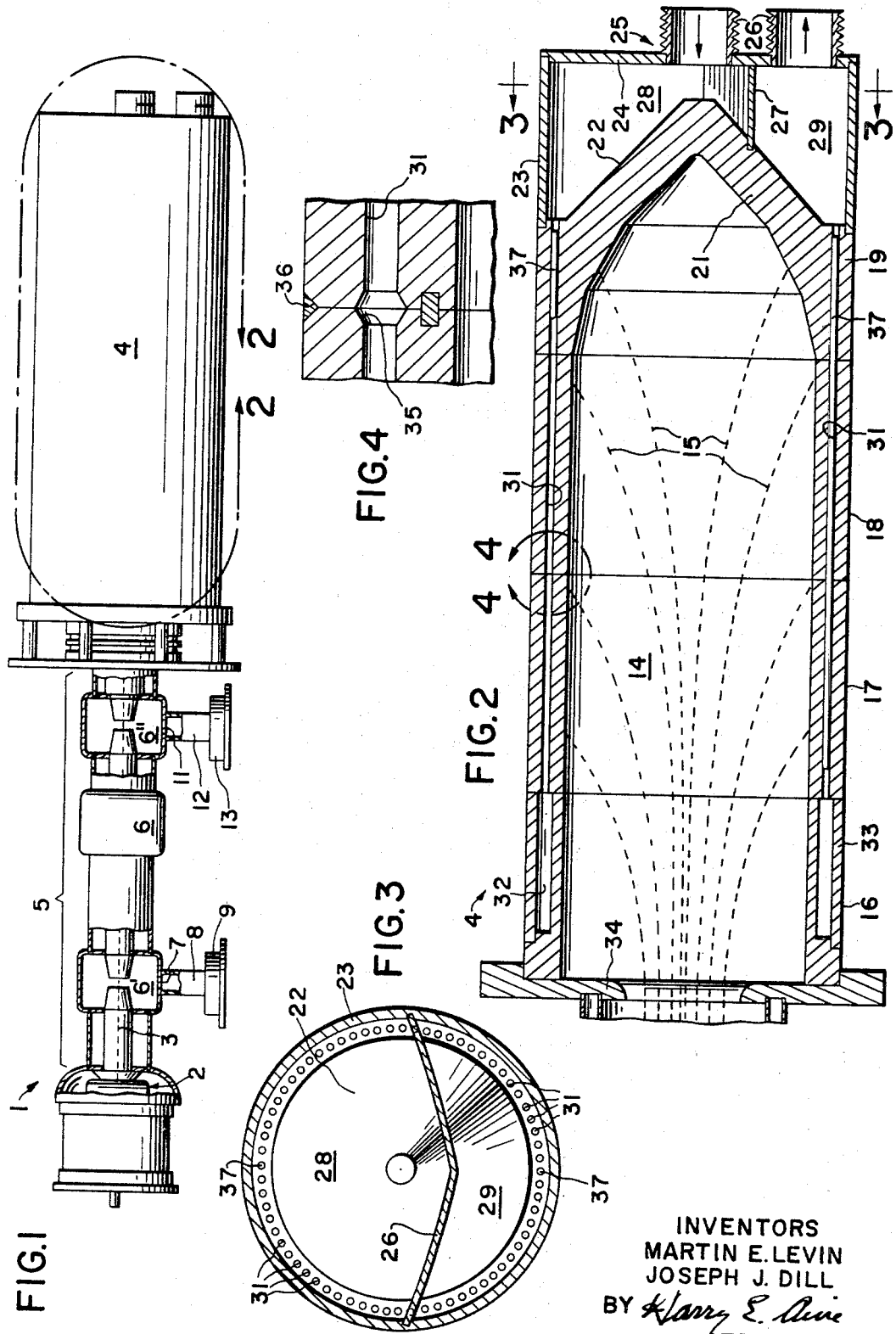

3,414,757
HIGH POWER BEAM TUBE HAVING IMPROVED BEAM COLLECTOR AND METHOD OF FABRICATING SAME
Martin E. Levin, Burlingame, and Joseph J. Dill, Santa Clara, Calif., assignors to Varian Associates, Palo Alto, Calif., a corporation of California
Filed Oct. 7, 1965, Ser. No. 493,802
7 Claims. (Cl. 315—5.38)

ABSTRACT OF THE DISCLOSURE

A high power beam tube is disclosed. The beam tube includes an electron gun for forming and projecting a beam of electrons having an average power in excess of 100 kw. over an elongated beam path to a beam collecting structure for collecting the beam and dissipating the energy thereof. A microwave interaction circuit is disposed along the beam path intermediate the gun and the collector. The collector structure includes a plurality of ring-like tubular copper segments coaxially aligned and joined together at their abutting ends in a gas-tight manner to define the side walls of a beam collecting cavity within which the beam is collected. The tubular segments of the collector each include an array of circumferentially spaced apart bores arranged around the tubular segments and passing through the segments from one end to the other. Adjacent ones of the tubular segments are aligned so that the bores of adjacent ones of the segments are in registration with each other to define an array of coolant channels passing the length of the collector body. Collector structures of this type are especially useful when the diameter of the beam collecting cavity is greater than six inches in diameter and the collector has a weight in excess of 200 pounds, since constructing the beam collector in ring segments greatly facilitates handling and machining of such large and heavy structures.

Heretofore large beam collectors for such high power tubes have generally been built by boring out the interior of an elongated cylindrical block of solid copper to provide a beam collecting cavity and by machining a suitable array of closely spaced grooves on the outside surface of the hollow block member. A metallic tubular jacket as of stainless steel was then typically brazed over the lands between the grooves to form an array of coolant channels which traversed the length of the collector. A suitable fluid distributor manifold was brazed over the outside of the closed end of the hollow collector member for distributing and returning the coolant fluid. Such a typical prior art beam collector is shown and described in U.S. Patent No. 3,098,165.

One of the problems of such a prior collector structure was the difficulty encountered in handling and brazing such a large and heavy structure. A minimum weight for such a large collector (200 kw. average) is on the order of 200 pounds and mere handling of such a heavy structure required for machining becomes difficult. In addition, the large mass of the collector required several hours in the brazing furnace in order to reach thermal equilibrium at the brazing temperature. All of the above machining, brazing and handling operations made the fabrication costs of the collector assembly excessive.

In the present invention, the collector is fabricated by brazing together at their ends a plurality of coaxially aligned ring segments of thick walled tubing, as of copper. The resultant structure is closed at the end by a machined block of copper. The intermediate ring segments and the end block are drilled about their perimeters with an array of axially directed bores. The bores are axially aligned in adjacent segments to provide an array of coolant channels traversing the length of the composite beam collector. The beam entrance end ring segment of the collector is provided with an annular chamber in its wall which communicates with the axially directed coolant channels. The closed end of the collector includes a septum separating the channels into two sets and forming an input and output coolant distributor manifold which directs the coolant fluid into preferably slightly more of the coolant channels than that from which it collects the heated return coolant whereby the velocity of the return coolant is increased to improve its cooling effect to counteract its increased temperature whereby uniform cooling is obtained around the circumference of the collector. Uniform cooling is desired to prevent unwanted localized boiling of the coolant with consequent deposit of impurities contained therein which would otherwise produce eventual restriction of the coolant channels and burn-out of the collector.

Thus the advantages of the present collector structure and its method of fabrication include: simplicity of construction thereby appreciably reducing tube fabrication costs, and improved uniformity of cooling to permit optimum power dissipation in the collector without producing unwanted boiling of the coolant.

The principal object of the present invention is to provide a high power beam tube having an improved beam collector and method of fabricating same.

One feature of the present invention is the provision of a large high power beam collector structure formed in part by a plurality of ring-like tubular segments, each segment including an array of axially directed bores around the periphery thereof, and with the segments being sealed together at their abutting ends in coaxial alignment and with the array of bores being in axial registration in adjacent segments to provide an array of coolant channels, whereby collector fabrication is facilitated.

Another feature of the present invention is the provision of a collector structure having an array of coolant channels with a first set of input channels passing fluid along the collector in one direction and a second set returning the same fluid along the collector in the opposite direction, and the channels being arranged to provide a higher fluid velocity in the return set of channels, whereby uniform cooling of the collector is obtained.

Another feature of the present invention is the same as the preceding feature wherein the increased velocity of the return fluid is obtained by providing fewer channels in the return set whereby all the channels may have the same dimensions for ease of fabrication.

Another feature of the present invention is the method of fabricating a collector structure according to the first feature wherein the ring segments are drilled, stacked in axial alignment with the drilled holes in registration and brazed together at their abutting ends to form the collector structure.

Other features and advantages of the present invention will become apparent upon a perusal of the following specification taken in connection with the accompanying drawings wherein:

FIG. 1 is a longitudinal view partly in section of a high power microwave beam tube employing the collector feature of the present invention, FIG. 2 is an enlarged longitudinal sectional view of the collector portion of FIG. 1 delineated by line 2—2, FIG. 3 is a transverse sectional view of the structure of FIG. 2 taken along line 3—3 in the direction of the arrows, and FIG. 4 is an enlarged sectional view of a portion of the structure of FIG. 2 delineated by line 4—4.

Referring now to FIG. 1 there is shown a typical high power beam tube 1 employing the improved collector of the present invention. More specifically, the tube 1 is an L-band three cavity klystron power amplifier designed for wide band tropospheric-scatter communication service at frequencies from 750 to 985 mc. The tube 1 provides 13 db gain with a C.W. R.F. average output power of 75 k.w. and has an average collector dissipation of about 200 kw.

The tube 1 comprises an electron gun assembly 2 for forming and projecting a beam of electrons 3 over an elongated beam path to a beam collector structure 4 for collecting and dissipating the energy of the spent beam. An electromagnetic interaction circuit 5 is positioned along the beam path 3 intermediate the gun 2 and collector 4 for electromagnetic interaction with the beam passable therethrough in the conventional klystron mode of operation. The circuit 5 comprises a plurality of reentrant cavity resonators 6 successively arranged along the beam path 3.

A microwave input signal, to be amplified by the tube, is applied to excite the first or input cavity 6' via iris 7, input waveguide 8 having a wave permeable R.F. window assembly 9 vacuum sealed thereacross. Amplified R.F. signal wave energy is extracted from the beam via output cavity 6" and fed to a suitable load or utilization device, not shown, via output iris 11 and waveguide 12 having a wave permeable R.F. window assembly 13 vacuum sealed thereacross.

The collector structure 4 of the present invention is shown in greater detail in FIGS. 2-4. A beam collector cavity 14, which receives the expanded incident beam of electrons on the interior walls thereof as indicated by electron trajectory lines 15, is formed by a plurality of tubular ring-like segments 16, 17 and 18 as of relatively thick walled copper tubing. The collector cavity 14 includes an end closing wall segment 19 formed by a hollowed out cylindrical copper block. The hollowed out portion of the block has a tapered end section which converges to provide an outwardly domed end wall 21 for the collector cavity 14. The outside surface of the domed wall 21 is also machined to provide a frustoconical surface 22 to facilitate distribution and collection of coolant liquid, more fully described below.

A cylindrical jacket 23 as of copper surrounds the conical wall 22 and is closed at its outer end by a circular end plate 24 to form a coolant distributor manifold 25. The end plate 24 has two openings therein provided with pipe nipples 26 for attaching suitable pipes, not shown, for bringing in and taking out liquid coolant from the collector 4. A septum 27 is sealed across the manifold 25 dividing it into an input section 28 and an output section 29.

The two intermediate ring-like tubular collector segments 17 and 18 and the end segment 19 is each provided with an array of axially directed bores 31 closely spaced to each other around the perimeter of the segments 17, 18 and 19. The beam entrance ring segment 16 of the collector includes an annular chamber 32 formed in the wall of the tubing by machining down the outer diameter of the tubular segment 16 and brazing a ring portion 33 as of copper over the machined section. A centrally apertured circular mounting plate 34, as of copper, is disposed at the beam entrance end of the collector 4.

The collector is fabricated by machining as necessary, the segments 16 and 19 and by drilling the axial bores 31 in the tubular segments 17, 18 and 19. The bores 31 are conveniently drilled by a suitable jig, not shown, which allows drilling partially through the segments from one end and then completing the bores by drilling through from the other end of the segments. Each of the bores 31 is outwardly flared 35 at the ends to prevent blockage of the bores by brazing material which would otherwise be drawn into the bores 31 by capillary attraction. Also the segments 16, 17, 18 and 19 are beveled at their outside abutting end portions 36 to accommodate the brazing rings and facilitate sealing.

The segments 16, 17, 18 and 19 are assembled in coaxial alignment with the bores 31 in adjacent segments 17, 18 and 19 being arranged in registry. This registration of the bores is conveniently obtained by sliding a pair of stainless steel rods 37 through a pair of bores 31 in the aligned segments 17, 18 and 19. The other parts of the collector 4 are also assembled and the assembled collector structure with brazing rings in place is heated to brazing temperature in a brazing furnace for brazing together the entire collector assembly. The brazed collector 4 is then cleaned, mounted on the tube and the tube processed in the conventional manner.

In a typical example of a collector 4 of the present invention the collector parts had the following dimensions and specifications: The inside diameters of the tubular copper segments 16, 17 and 18 were 7.5" and 9.5" outside diameter with an axial length of 6". The end segment 19 had a length of 7.625" with the bores 31 in that segment being 4" in length. The bores 31 had a diameter of 0.187" with 90 bores positioned around the perimeter of each drilled segment. The annular chamber 32 had a length of 4" and a width of 0.374". Two of the bores 31 were closed off due to the presence of the aligning rods 37 and septum 27 was arranged to provide 46 bores in direct fluid communication with the input chamber 28 and 42 bores in direct fluid communication with the output chamber 29 of the collector manifold 25. Eighty gallons/minute of ethylene-glycol coolant solution flowed through the collector under a head of 50 p.s.i. for cooling. With these specifications the collector 4 dissipated 210 kw. average power without boiling of the coolant and had a weight of about 250 pounds.

Uniform cooling of the collector 4 is obtained by increasing the velocity of the warmer return flow coolant compared to the velocity of the cooler input coolant which traversed the collector in the first direction. This increase in velocity is conveniently obtained by providing fewer return flow channels or bores 31 by means of the positioning of the septum 27. The rationale behind increasing the velocity of the return fluid is as follows: The quantity of heat that is absorbed per unit volume by the coolant is proportional to the temperature difference $\Delta T$ between the coolant is taken as 105° C., the average temperature Typical numbers for these quantities are as follows: The desired uniform collector surface temperature adjacent the coolant is taken as 105° C. the average temperature of the coolant in the input array of bores 31 is taken as 25° C. and 35° C. in the output array of bores after the first pass of the coolant down the length of the collector. Thus $\Delta T$ for the return flow is 12% less than for the input flow and since the quantity of heat absorbed per unit volume of the coolant is also proportional to velocity V of the coolant to the ⅘ power ($V^{4/5}$), uniform cooling is obtained by increasing $V^{4/5}$ by 12%. A 12% increase in velocity of the return coolant flow is accomplished by decreasing the number of return fluid channels sufficiently to raise $V^{4/5}$ by 12%. As an alternative the return flow bores 31 are reduced in diameter compared to the input bores 31 but this latter alternative is less desirable than the first method as it complicates fabrication.

In the collector 4 the 12% increase in velocity of the fluid in the return channels or bores 31 was obtained by providing 42 bores communicating directly with the output manifold chamber 29 as compared to 46 bores 31 communicating directly with the input chamber 28 of the manifold 25.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high power beam tube apparatus including, means for forming and projecting a beam of electrons having an average power in excess of 100 kw. over an elongated beam path, means at the terminal end of the beam path for collecting the beam and dissipating the energy of the spent beam, means forming an electromagnetic interaction circuit disposed along the beam path intermediate said beam forming means and said beam collecting means for electromagnetic interaction with the beam, said collector means including a plurality of ring-like tubular thermally conductive metallic segments coaxially aligned and joined together at their abutting ends in a gas tight manner to define the side walls of a beam collecting cavity with the beam being incident upon said side walls, said tubular segments each including an array of circumferentially spaced apart bores arranged around said ring-like segments and passing through from one end to the other of said segments, and adjacent ones of said tubular segments being aligned so that the bores of adjacent ones of said segments are in registration with each other such that said aligned bores form an array of coolant channels traversing the length of said collector portion formed by said joined tubular segments, whereby fabrication of such high power beam collectors is facilitated.

2. The apparatus according to claim 1 wherein said beam collector means is of such a size that the beam collecting cavity is greater than six inches in diameter, and said collector means has a weight which exceeds 200 pounds.

3. The apparatus according to claim 1 including means for first passing a fluid coolant through a first set of said coolant channels in a first direction at a first velocity along said collector means and passing the same coolant fluid through a second set of said coolant channels in a second direction opposite to said first direction and at a higher velocity than said first velocity, whereby uniform cooling is obtained for said collector means.

4. The apparatus according to claim 1 wherein said collector means includes a ring-like tubular beam entrance segment coaxially aligned and sealed in vacuum tight manner at an abutting end with one of said aforementioned tubular segments, and said beam entrance segment including an annular chamber in its side wall in fluid communication with said array of coolant channels for interconnecting the common ends of the channels of said array.

5. The apparatus according to claim 1 wherein said beam collector means includes an end wall segment coaxially aligned with said tubular segments for closing off the end of said collector cavity and having an array of axially directed bores about the perimeter thereof, said end wall segment being sealed in a gas tight manner at an abutting end portion with an adjacent one of said tubular segments, and said arrays of axially directed bores in both said sealed adjacent segments being in axial registry for flow of coolant fluid therebetween.

6. The apparatus according to claim 5 including means forming a coolant distribution manifold sealed over the outside surface of said end wall segment, and said manifold means including a septum separating the manifold into input and output manifold chamber portions, and said input manifold chamber portion being in direct fluid communication with a first set of said coolant channels and said output chamber portion being in direct fluid communication with a second set of said coolant channels.

7. The apparatus according to claim 6 wherein said coolant channels are of the same dimensions and there are more coolant channels in said first set than in said second whereby more uniform cooling of collector means is obtained.

References Cited

UNITED STATES PATENTS

| | | | |
|---|---|---|---|
| 1,492,038 | 4/1924 | Leonarz | 313—30 |
| 3,169,206 | 2/1965 | Nelson | 315—5.39 |

HERMAN KARL SAALBACH, *Primary Examiner.*

S. CHATMON, JR., *Assistant Examiner.*